United States Patent
Wallington et al.

(10) Patent No.: US 12,006,861 B2
(45) Date of Patent: Jun. 11, 2024

(54) ELECTRIC TURBOMACHINE HAVING COMPRESSOR AND POWER ELECTRONICS AND CONTROL ASSEMBLIES

(71) Applicant: Bowman Power Group Limited, Southamptom (GB)

(72) Inventors: Steve Wallington, Southampton (GB); Rob Fallon, Southampton (GB); Owen Creese-Smith, Southampton (GB); Keith Fry, Southampton (GB); Ivan Cordero-Orille, Southampton (GB); Mike Hartridge, Southampton (GB); Shinri Szymko, Southampton (GB); Paul Dowman-Tucker, Southampton (GB)

(73) Assignee: Bowman Power Group Limited, Southampton (GB)

( * ) Notice: Subject to any disclaimer, the term of this patent is extended or adjusted under 35 U.S.C. 154(b) by 0 days.

(21) Appl. No.: 17/800,520

(22) PCT Filed: Dec. 18, 2020

(86) PCT No.: PCT/GB2020/053275
§ 371 (c)(1),
(2) Date: Aug. 17, 2022

(87) PCT Pub. No.: WO2021/165631
PCT Pub. Date: Aug. 26, 2021

(65) Prior Publication Data
US 2023/0340902 A1    Oct. 26, 2023

(30) Foreign Application Priority Data
Feb. 18, 2020  (GB) ..................... 2002218

(51) Int. Cl.
*F02B 39/10* (2006.01)
*F02B 33/40* (2006.01)
(Continued)

(52) U.S. Cl.
CPC .............. *F02B 39/10* (2013.01); *F02B 33/40* (2013.01); *F04D 29/4206* (2013.01);
(Continued)

(58) Field of Classification Search
CPC ......... F02B 39/10; F02B 33/40; H02K 5/203; H02K 11/02; H02K 11/215; H02K 11/33; H02K 2211/03
See application file for complete search history.

(56) References Cited

U.S. PATENT DOCUMENTS

2008/0200079 A1 *  8/2008  Jansen .................... B60L 50/20
                                                           440/6
2017/0012506 A1 *  1/2017  Naito ..................... H02K 11/33
(Continued)

FOREIGN PATENT DOCUMENTS

EP    1260714 A1     11/2002
EP    2436926 B1 *   4/2018   .............. F04B 35/04
(Continued)

OTHER PUBLICATIONS

English Machine Translation of WO2017055741A1 via USPTO Fit datebase on Sep. 17, 2023 (Year: 2017).*
(Continued)

*Primary Examiner* — Dominick L Plakkoottam
*Assistant Examiner* — Paul W Thiede
(74) *Attorney, Agent, or Firm* — Shumaker & Sieffert, P.A.

(57) ABSTRACT

An electric turbomachine for use with an internal combustion engine, a turbocharger or a fuel cell e-compressor includes a high-speed electrical machine located internally
(Continued)

within a housing that is arranged to be rotationally driven by a shaft about a rotational axis; a compressor that is arranged to compress fluid within a turbo compressor when it is rotationally driven about the rotational axis by the shaft; a power electronics assembly that is arranged to supply power to the electrical machine; and a control assembly that is arranged to control the power supplied by the power electronics assembly to the electrical machine. The power electronics assembly is mounted externally on the housing on a first surface of the housing, and the control assembly is mounted externally on the housing on a second surface of the housing.

22 Claims, 8 Drawing Sheets

(51) Int. Cl.
*F04D 29/42* (2006.01)
*F04D 29/58* (2006.01)
*H02K 5/20* (2006.01)
*H02K 7/18* (2006.01)
*H02K 9/19* (2006.01)
*H02K 11/02* (2016.01)
*H02K 11/215* (2016.01)
*H02K 11/30* (2016.01)
*H02K 11/33* (2016.01)

(52) U.S. Cl.
CPC .......... *F04D 29/584* (2013.01); *H02K 5/203* (2021.01); *H02K 7/1823* (2013.01); *H02K 9/19* (2013.01); *H02K 11/02* (2013.01); *H02K 11/215* (2016.01); *H02K 11/30* (2016.01); *H02K 11/33* (2016.01); *H02K 2211/03* (2013.01)

(56) References Cited

U.S. PATENT DOCUMENTS

| | | | |
|---|---|---|---|
| 2017/0037858 A1* | 2/2017 | Back | F04D 25/06 |
| 2023/0118102 A1* | 4/2023 | Wallington | F02B 33/40 |
| | | | 290/52 |

FOREIGN PATENT DOCUMENTS

| | | | | |
|---|---|---|---|---|
| KR | 20190054717 A | | 5/2019 | |
| WO | WO-2009139416 A1 * | | 11/2009 | ............ F04B 39/121 |
| WO | 2014210093 A1 | | 12/2014 | |
| WO | WO-2017036837 A1 * | | 3/2017 | ......... F04D 13/0686 |
| WO | 2017055741 A1 | | 4/2017 | |

OTHER PUBLICATIONS

English Machine Translation of WO2009139416A1 via USPTO Fit Database on Jan. 30, 2024 (Year: 2009).*
International Search Report and Written Opinion of International Application No. PCT/GB2020/053275 dated Apr. 26, 2021, 13 pp.

* cited by examiner

ELECTRIC TURBOMACHINE HAVING COMPRESSOR AND POWER ELECTRONICS AND CONTROL ASSEMBLIES

This application is a national stage application under 35 U.S.C. § 371 of PCT Application No. PCT/GB2020/053275, filed Dec. 18, 2020, which claims the benefit of Great Britain Application No. 2002218.2, filed Feb. 18, 2020. The entire contents of both PCT Application No. PCT/GB2020/053275 and Great Britain Application No. 2002218.2 are incorporated herein by reference.

FIELD OF THE INVENTION

The present invention relates to an electric turbomachine for use with an internal combustion engine, a turbocharger, or a fuel cell e-compressor, and more particularly to an electric turbomachine comprising power electronics mounted externally on the surface of the electric turbomachine.

BACKGROUND TO THE INVENTION

Regulations and a need to combat climate change continue to push internal combustion engines to have both lower emissions and greater efficiency. However, the need to optimise the operation of engines in vehicles further at key running points still remains a challenge in this field. Many existing applications use a turbocharger, where the energy contained within exhaust gases is extracted via a turbine connected to a compressor housing to improve the power density and thermal efficiency of an engine. Additionally, there is a latent need to improve the efficiency of other internal combustion engines such as stationary gensets and air handling systems for feeding fuel-cells.

Aerodynamic matching of the exhaust driven turbocharger turbine, or compressor, involves a compromise between transient response at low load and power targets at high load. Due to this trade off, the drive for ultimate efficiency at certain running points can in turn adversely impact running points at other engine running conditions, which is undesirable both from a driver satisfaction and an engine emissions viewpoint.

One of the possible solutions to this problem is to provide electrified turbomachinery or electric turbomachines, which are known as an electric compressor, electric supercharger or electric turbocharger, to provide additional boost pressure.

In the electric turbomachines, a high-speed electrical machine, such as a permanent magnet synchronous motor, is used, for example, to accelerate the compressor component of the electric turbomachinery to provide additional boost pressure to the engine or to accelerate the compressor of the turbocharger to reduce response times. A high-speed electrical machine is considered to be an electrical machine where the magnetic rotor surface reaches speeds in excess of 80 meters/second (m/s) and even greater than 200 m/s. Typically, if the electrical machine is directly attached to the compressor or another turbomachine then it is classified as high-speed.

However, several issues with current electrified machinery technology has prevented their wider proliferation. For example, electrified machinery requires power electronics systems to convert the direct current (DC) available from the vehicle's power system to the alternating current (AC) required to power suitable high-speed electrical machines such as permanent magnet synchronous motors. The power electronic systems typically comprise both power printed circuit board assemblies (power PCBA) and control printed circuit board assemblies (control PCBA). Both of these PCBAs comprise heat sensitive components and components that generate substantial heat such as capacitors and transistors. Accordingly, the power PCBA and the control PCBA typically require complex, separate cooling systems. These cooling systems not only thermally protect the power PCBA and the control PCBA by removing heat, or cooling, that they themselves generate, but the cooling systems also remove heat emitted by electric turbomachine (e.g. from the high-speed electrical machine and the heat of the compressed fluids of the compressor) and the high-ambient temperatures that are produced by the internal combustion engine itself.

The cooling systems are typically dedicated water-cooled jackets or heat sinks for cooling individual components or component groups. For example, a dedicated water-cooled heat sink, radiator and pump can be included to cool the power electronics assembly and a separate water-cooled jacket, radiator and pump can be included to cool the electrical machine of the electric turbomachine. However, the inclusion of these dedicated water-cooled jackets or heat sinks is undesirable due to their size, cost, weight, reliability, lifetime and maintenance.

Additionally, electric turbomachine applications require a very high lifetime requirement, without component replacement, to be economically and practically viable. As such, it is important that all components of the electric turbomachine, such as the electrical machine, power PCBA and control PCBA are kept below their heat rating. Thus, providing adequate cooling to the electric turbomachine and its associated components is a key factor in their design.

An additional problem associated with the power electronics of electric turbomachines is that the provision of the power PCBA and the control PCBA and their cooling systems typically increases the footprint and weight of the electric turbomachine to such a degree that incorporating the electric turbomachine in close proximity with the internal combustion engine of the vehicle, as is required for optimal performance, is challenging. Further, they are tight constraints on space envelope, for packaging purposes. As such, decreasing the size of components or eliminating them entirely is desirable.

In the state of the art, power electronics assemblies are installed separately away from the electric turbomachine and, for example, the internal combustion engine. This makes it possible to enable operation of the power electronics systems (i.e. the control PCBA and the power PCBA) within a cooler and more benign environment. This has the benefit of having a reduced cooling demand and may allow the design of more compact power PCBA and control PCBA. However, the applicant has found this approach to be disadvantageous as it requires at least one additional cooling circuit, additional electrical power, additional electrical signals and additional mounting features. These additional features plus their requisite (electrical & coolant) connections and environmental sealing requirements increase the installation complexity, maintenance complexity, size, footprint, weight and associated failure modes of the electric turbomachine.

One solution is to produce a more compact implementation of design and separate features that could be accommodated within the space allocation. However, the applicant has found that the drawbacks of this method, such as the complex manufacturing techniques and increased costs are disproportionately large to the advantages.

Another problem with state of the art turbomachines is that the stator of the electrical machine self-generates a large amount of heat; if this heat is not removed efficiently then the heat that it emits can cause very short component lifetime.

Objects and aspects of the present invention seek to alleviate at least these problems with the prior art.

SUMMARY OF THE INVENTION

According to a first aspect of the present invention there is provided an electric turbomachine for use with an internal combustion engine, a turbocharger or a fuel cell e-compressor, said electric turbomachine comprising: a high-speed electrical machine located internally within a housing that is arranged to be rotationally drive a shaft about a rotational axis (R); a compressor that is arranged to compress fluid within a turbo compressor when it is rotationally driven about the rotational axis (R) by the shaft; and a power electronics assembly that is arranged to supply power to the electrical machine; a control assembly that is arranged to control the power supplied by the power electronics assembly to the electrical machine; wherein the power electronics assembly is mounted externally on the housing on a first surface of the housing and the control assembly is mounted externally on the housing one a second surface of the housing.

In this way, the power electronics assembly and control assembly for the high-speed electrical machine are located on separate surfaces of the housing of the electric turbomachine. This locates both the power electronics assembly and the control assembly in close proximity to the high-speed electrical machine while spatially separating the power electronics assembly and the control assembly. Locating the power electronics assembly and control assembly in close proximity to the electrical machine is beneficial in that the size of the electronic turbomachine is decreased, the need for separate mounting features proximate to the electrical turbomachine is decreased and the efficiency of power transfer can be increased as due to the shorter and potentially reduced number electrical connections. Separating the power electronics assembly and the control assembly on two different and spatially separated surfaces of the housing (i.e. the first surface and the second surface) is also beneficial. This is because these two heat-generating components are located further apart meaning that higher power ratings assemblies can be mounted onto the housing compared to electric turbomachines that have the power electronics assembly and control assembly mounted on the same surface. Overall, this can beneficially reduce the weight, volume, size, footprint, number of associated failure points, cooling system requirements and installation and maintenance complexity of electric turbomachine.

The fluid that is compressed by the electric turbomachine depends on the use and deployment of the electric turbomachine. Typically, the fluid compressed by the compressor in use is air or exhaust fluids from an internal combustion engine, for example, however other fluids may also be compressed.

Preferably, the first surface and the second surface are separated by a protrusion or protuberance from the housing. In this way, a portion of the housing separates the first surface and the second surface. This can be beneficial for providing each of the power electronics assembly and the control assembly with different connections, covers and local environments that are separate from one another.

Preferably, the first surface and the second surface are angled with respect to one another. More preferably, the first surface and the second surface are substantially orthogonal with respect to one another. Even more preferably, the first surface lies in a plane that is substantially parallel with the rotational axis (R) and the second surface lies in a plane that is substantially orthogonal to the rotational axis (R). By angling the surfaces to one another, the power electronics assembly and the control assembly can be made to closely conform with the housing along its exterior, which reduces the packing size of the electric turbomachine. In has been found particularly advantageous for the first surface (and therefore, the power assembly electronics assembly) to be parallel with the rotational axis of the shaft and second surface (and, therefore, the control assembly) to be orthogonal to the rotational axis of the shaft. Such configurations have been found to be improve packaging, reduce size and provide more than sufficient spacing between heat generating components.

Preferably, the power electronics assembly is mounted externally on the housing such that the circumferential footprint of the power electronics assembly is smaller than the circumferential footprint of the turbo compressor. The circumferential footprint of an object is the distance from the outer edge, outer boundary or circumference of that object and the rotational axis of the shaft. Or, in other words, the circumferential footprint is defined as the distance between the rotational axis and the part of the object that has the greatest distance from the rotational axis in any radial direction from the rotational axis. Accordingly, in this preferred embodiment, the circumferential footprint of the power electronics assembly is smaller than the circumferential footprint of the turbo compressor such that when the electric turbomachine is viewed from the drive-end of the electrical machine on a position on the rotational axis the view of the power electronics assembly is completely blocked by the turbo compressor. In the prior art, the turbo compressor is typically the part of the electric turbomachine with the largest circumferential footprint and the power electronics assembly are typically mounted completely outside of its circumferential footprint and not attached to the housing. Thus, the present invention provides the benefit of reducing the size and space envelope of the electric turbomachine and power electronics assembly thus making it easier to fix proximate to other components, such as an internal combustion engine.

Preferably, the electric turbomachine comprises a jacket for shielding the electrical machine from electromagnetic interference (EMI). The jacket therefore may also shield the power electronics assembly from the electrical machine.

Preferably, the power electronics assembly is mounted externally on the housing such that the circumferential footprint of the power electronics assembly is smaller than the circumferential footprint of the housing. The housing of the electric turbomachine is typically not uniform along its length (i.e. the direction parallel the rotational axis), and the power electronics assembly is mounted on a portion on the housing that has a smaller circumferential footprint that the largest circumferential footprint of the housing. Mounting the power electronics assembly in this manner is beneficial for reducing the size of the electric turbomachine and its power electronics assembly.

Preferably, the power electronics assembly comprises a plurality of power PCBs, or power printed circuit boards, that are each externally mounted on the housing on a different surface to the second surface upon which the control assembly is mounted. The plurality of printed circuit boards (PCBs) will comprise or be populated with electronic components to form printed circuit board assemblies (PCBA) in use. Splitting the power electronics assembly and its power PCB into a plurality of power printed circuit boards means that each of the individual printed circuit boards in the plurality can be smaller than a single monolithic power PCB. Thus, the plurality of power PCBs can be more easily fitted onto and mounted onto the housing of the electric turbomachine. Additionally, splitting the power PCBs into a plurality makes it easier to mount the power PCBs with a circumferential footprint that is smaller than either the turbo compressor or the housing.

In some embodiments, it is preferable that, each of the power PCBs in the power electronics assembly is mounted on the first surface. This can reduce the length and complexity of connections between the individual power PCBs.

In other embodiments, it is preferably that, at least one of the power PCBs in the plurality of power PCBs is mounted on the first surface and at least one of the power PCBs in the plurality of power PCBs is mounted externally on a third surface of the housing. This can be beneficial for fitting and mounting each of the power PCBs in a smaller space envelope.

Preferably, the adjacent power PCBs in the plurality of power PCBs are mounted an angle to one another. This is beneficial as mounting adjacent power PCBs at an angle to one another is a method for decreasing the circumferential footprint of the power PCB. This method is advantageous as the power PCBs and PCBs in general are usually planar, so mounting them parallel with one another ultimately increases the circumferential footprint of the electric turbomachine.

Preferably, the adjacent power PCBs in the plurality of power PCBs are mounted orthogonally to one another. Since PCBs are usually planar it is thought that mounting the PCBs orthogonally to one another forms a configuration with the smallest circumferential footprint. This is especially true given by power PCBs are typically planar. Preferably, the plurality of power PCBs are mounted in a flat-bottomed valley configuration or a square-bottom U-configuration.

Preferably, the plurality of power PCBs surround over 50% of the circumference of the housing. More preferably, the plurality of the power PCBs surround over 50% of the circumference of the housing at the mid-point of the housing in the direction parallel with the rotational axis. By surrounding over 50% of the circumference, the plurality of power PCBs are spread out around the housing, which spreads out the heat they produce and reduces the circumferential footprint of the power PCBs.

Preferably, each power PCB in the plurality of power PCBs is mounted onto the housing in a direction substantially parallel with the rotational axis of the electric turbomachine. Thus, it is preferable to mount each power PCB onto a side wall of the housing, where the side wall extends in a direction substantially parallel to the rotational axis and between the drive-end and non-drive end of the electric turbomachine. It is preferable to mount the power PCBs onto the side wall as the side wall of the housing is typically the largest wall of the housing.

Preferably, the number of power PCBs in the plurality of power PCBs is three, six or nine. The number of power PCBs is a multiple of three as this relates to the conversion of the DC power to three-phase AC power typically used by high-speed electrical machines.

Preferably, each of the power PCBs in the plurality of power PCBs comprises substantially identical circuitry as the other power PCBs in the plurality of power PCBs. In this way, the circuitry used by the power electronics assembly can be evenly mounted and spread across the housing. This avoid the formation of particular hot zones, for example.

Preferably, each of the power PCBs in the plurality of power PCBs powers a different phase of the high-speed electrical machine. In particularly preferred embodiments, the number of power PCBs is a multiple of three such that an equal number of power PCBs are each related to one of the phases of three-phase AC power typically used by high-speed electrical machines.

Preferably, each of the power PCBs in the plurality of power PCBs is mounted substantially centrally along the electric turbomachine in the direction parallel with the rotational axis. Each of the power PCBs is preferably and typically shorter than the housing. In this way, each of the power PCBs are removed from either end of the electric turbomachine. It is beneficial to be removed from the drive-end of the electric turbomachine as this end is typically the hottest end of the machine. Additionally, centrally aligning the power PCBs prevents them from increasing the size of the electric turbomachine at either the drive-end or the non-drive-end.

Preferably, the plurality of power PCBs are electrically connected by a busbar comprising two or one angled portions. Preferably, the shape of the busbar comprises a two or more portions that are parallel with power PCBs in the plurality of power PCBs.

Preferably, the power electronics assembly is mounted directly onto the housing by fixings such as screws. Mounting the power electronics assembly directly onto the housing, rather than protruding mounting features helps to reduce the circumferential footprint of the power electronics assembly.

Preferably, the each of the power PCBs is mounted flush with the housing. Or, in other words, the housing comprises substantially planar portions onto which the power PCBs can be mounted. This helps to reduce the size of the electric turbomachine.

Preferably, the power electronics assembly is protected from the external environment by a substantially airtight and watertight cover that is also mounted onto the housing. The cover helps to protect the power electronics from the harsh external conditions that are typically associated with places where electric turbomachines are used. The airtight and watertight rating of the cover will meet the regulations and standards, such as Ingress Protection Ratings, required by its use and operation. For example, electric turbomachine may be mounted in an engine bay proximate to an internal combustion engine, turbocharger or e-compressor and, therefore, the cover would help protect the power electronics from heat, increased pressures, water ingress, dust, humidity and grease. Preferably, the airtight and watertight cover is electrically grounding or insulating. In this way, the cover acts as a safety device preventing electric shocks during as it is a physical barrier that prevents access to live electrical terminals reducing the chance of electric shocks during, for example, maintenance of the electric turbomachine or surrounding components.

Preferably, the airtight and watertight cover is formed from a single-piece and is substantially U-shaped. Forming the cover from a single piece that is U-shaped reduces the number of associated failures points and reduces the number and length of airtight and watertight seals. Alternatively, in embodiments comprising a plurality of power PCBS, it can be preferable for each of the power PCBs to be protected from the external environment by its own airtight and watertight cover.

Preferably, the power electronics assembly and the electrical machine are electrically connected by a braided busbar. The braided busbar is beneficial in that it is resistant to damage caused by thermal expansions and the vibrations associated with being in close proximity with an electrical machine in use and, therefore, improves the lifespan of the electrical connection.

Preferably, the electric turbomachine further comprises a control assembly that is arranged to control the power supplied by the power electronics assembly to the electrical machine. The control assembly controls the power supplied to the power electronics assembly based on the boost pressure or other engine parameters that are resultant from a change in boost pressure required versus the boost pressure being currently produced. These variables can either be measured directly or indirectly (e.g. the speed of the electrical machine and load of the internal combustion engine) and then transmitted to control assembly.

Preferably, the control assembly is mounted externally on the housing at a different location or surface to the externally mounted power electronics assembly. In this way, the power electronics assembly and the control assembly are spaced apart on separate areas on the housing. This reduces the adverse heating affects that the power electronics assembly and the control assembly may have on one another and means that higher power assemblies can be mounted externally onto the housing.

Preferably, the control assembly is mounted externally on the housing such that the circumferential footprint of the control assembly is less than the circumferential footprint of the turbo compressor. Mounting the control assembly in this way reduces the size of the electric turbomachine as in the prior art the control system is traditionally mounted separately and removed from the housing of the electric turbomachine.

Preferably, the control assembly is mounted externally on the housing such that the circumferential footprint of the control assembly is less than the circumferential footprint of the housing. Mounting the control assembly in this way reduces the size of the electric turbomachine as in the prior art the control system is usually mounted separately and removed from the housing of the electric turbomachine.

Preferably, the control assembly is mounted on an end of the housing opposing the turbo compressor. Mounting the control assembly in this manner typically means that the control assembly, and its control PCB, are mounted in a direction perpendicular to the rotational axis of the shaft. It is preferable to mount the control assembly on the non-drive end of the housing (the end opposing the turbo compressor) as turbo compressor reduces the available space for the control assembly and the non-drive-end is typically cooler than the drive-end. Furthermore, it is also beneficial to mount the control assembly on the non-drive-end wall as in some preferable embodiments the power electronics assembly is mounted on the side wall of the housing. Thus, from the available space the non-drive-end wall is the best location for mounting the control assembly onto the housing.

Preferably, the control assembly comprises a sensor for directly detecting the rotational speed of the high-speed electrical machine. Preferably, the sensor detects the rotational speed of a permanent magnet located at the end of the shaft opposing the compressor through the housing of the electric turbomachine. In this way, the control assembly comprises a sensor for directly sensing the speed of the electrical machine. This is beneficial as the control assembly can directly detect the speed of the electrical machine that reduces the number of connections in the system, reduces the size of the system and can improve the responsiveness of the system. Additionally, by measuring the speed of the high-speed electrical machine, it may be possible in some embodiments for the control assembly to indirectly sense, infer or calculate the boost pressure produced by the compressor.

It is preferable that the power electronics assembly and control assembly are mounted substantially orthogonally to one another. In this arrangement, it is preferably that the power electronics assembly is mounted on the side wall and the control assembly is mounted on the non-drive-end wall. This configuration has been found to be optimal for using the available external surface of the housing as areas for mounting electronics and their cooling.

Preferably, the control assembly, and in particular the control PCB, is mounted flush with the housing. Or, in other words, the housing comprises a substantially planar portion onto which the control assembly can be mounted.

Preferably, the control assembly is protected from the external environment by a single-piece airtight and watertight control cover. Preferably, the control cover is substantially dome shaped. Forming the control cover from a single piece reduces the number of associated failures points and reduces the number and length of airtight and watertight seals.

Preferably, the electric turbomachine comprises a cooling system that is integrated within the housing of the electric turbomachine for cooling the electric turbomachine and the power electronics assembly simultaneously. When the electric turbomachine comprises a control assembly, it is preferable that the electric turbomachine comprises a cooling system that is integrated within the housing of the electric turbomachine for cooling the electric turbomachine and control assembly simultaneously. When the electric turbomachine comprises a control assembly, it is even more preferably that the electric turbomachine comprises a cooling system that is integrated within the housing of the electric turbomachine for cooling the electric turbomachine, the power electronics assembly and control assembly simultaneously. Since the power electronics assembly and/or control assembly are mounted onto the housing, it is beneficial to cool them by integrating a cooling system into the housing of the electric turbomachine. By integrating the cooling system, it can perform double-sided cooling on the internal components of the electric turbomachine (e.g. the electrical machine) and the externally mounted electronics (power electronics assembly and/or the control assembly). This integrated cooling system can therefore cool all the key components of the electric turbomachine and further reduce its size. Alternatively, separate and independent cooling systems can cool the power electronics assembly and the control assembly.

Preferably, the electric turbomachine is an electric compressor.

As discussed above, there is provided an electric turbomachine in which the power electronics assembly is mounted onto the housing of the electric turbomachine such that the power electronics assembly does not extend beyond the circumferential footprint of the electric turbomachine. Reduction in footprint refers to a reduction in the packaging size of the electric turbomachine. The present invention achieves this by reducing the diameter of the electric turbomachine as the power electronics do not extend beyond the maximum diameter defined by the housing and/or compressor of the electric turbomachine.

In one preferred embodiment, the power electronics may be directly mounted onto the machine by splitting the power PCB of the power electronics into three triplicated circuits. Each of the three power PCBs is smaller than a monolithic power PCB, even if cumulatively the size of the three power PCBs is similar to that of a monolithic PCB. However, by using separate and smaller power PCBs, it is possible to arrange these PCBs around the housing and electric turbomachine, staying within the outline of the machine and, essentially, within the overall confines of the space allocated.

Furthermore, the control PCB may be integrated onto the non-drive-end and non-drive-end wall of the electric turbomachine. By separating the control PCB from the power PCB, the size and complexity of the power PCB is reduced such that the power PCB can be more easily incorporated about the housing of the electric turbomachine. Additionally, mounting the control PCB directly onto the non-drive-end and non-drive-end wall enables the control PCB to directly comprise the sensor for detecting the rotational speed of the electrical machine. Removing the need for additional circuitry and failure points.

Accordingly, the present invention overcomes the issue with using a single monolithic power electronics assembly that the resulting aspect and volume is not readily accommodated within the space allocation of the electric turbomachine, and that its mounting features be extensive and non-conducive either in terms of minimising cost of materials or efficient use of available volume.

According to further preferred embodiments of the present invention there is provided an electric turbomachine in which the cooling system or cooling circuit for cooling the electrical machine and power electronics assembly of the electric turbomachine is integrated within the housing of the electric turbomachine. A cooling system of this nature can be provided by including a series of cavities or conduits that flow through the housing. The cooling system can be arranged such that the coolant fluid within the cooling system flows from the non-drive-end to the drive-end along an increasing temperature gradient.

By integrating the cooling system or cooling circuit within the housing of the electric turbomachine the housing itself is cooled and thereby cools any connected or nearby components. Further, providing the cooling system or cooling system within the housing means that the cooling is provided in a location as close to the heat generating or heat sensitive component as possible. For example, the portion of cooling system is proximate to the stator with self-generates substantial amounts of heat that with cooling would significantly shorten the lifetime of the stator, or the cooling system is proximate to the DE bearing helping to prolong the life of the bearing.

In this way, integrating the cooling system or circuit within the housing reduces the number of parts and associated failure points, efficiently uses previously dead or wasted space within the housing and electrical turbomachine.

This preferred embodiment of the electric turbomachine comprises a power electronics assembly mounted and provided directly on the housing of the electrical turbomachine, as well as a cooling system or circuit integrated within the housing of the electrical turbomachine. Such a combination of features is beneficial for a number of reasons.

Firstly, the transistors mounted on the power PCBs self-generate heat; if this heat is not removed then its temperature rises leading to a very short component lifetime. By mounting the power PCBs onto the housing of the electrical turbomachine, the cooling circuit within the housing used to cool the electrical machine can additional cool the power PCBs simultaneously. That is, the cooling circuit can perform double sided cooling. This eliminates the need for a separate power PCB cooling system reduce size, complexity and the number of failure points.

DETAILED DESCRIPTION

Embodiments of the present invention will now be described by way of example only and with reference to the accompanying drawings, in which.

Figure 1:
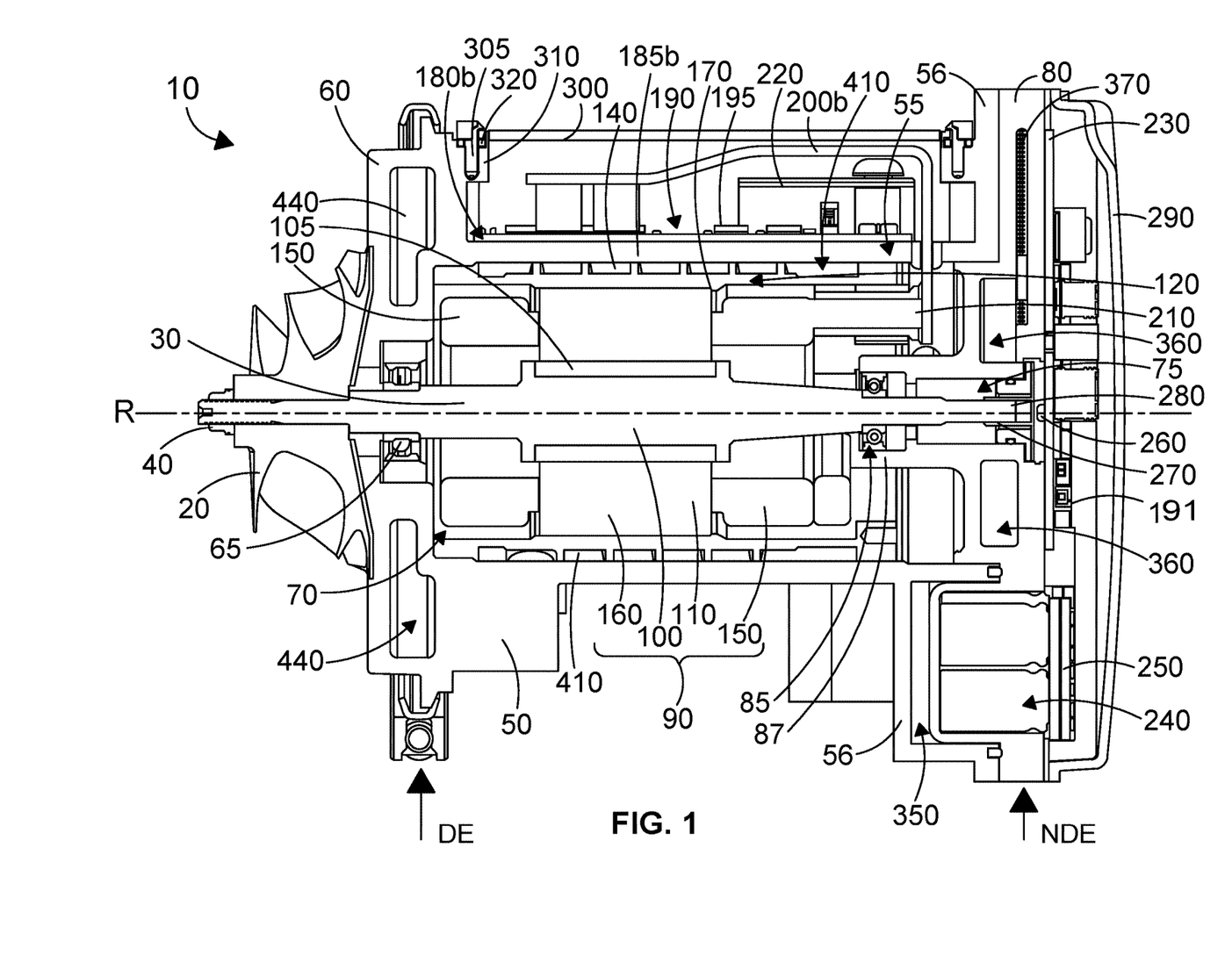
FIG. 1 is a cross-section of an electric compressor in accordance with the present claimed invention.
Figure 2:
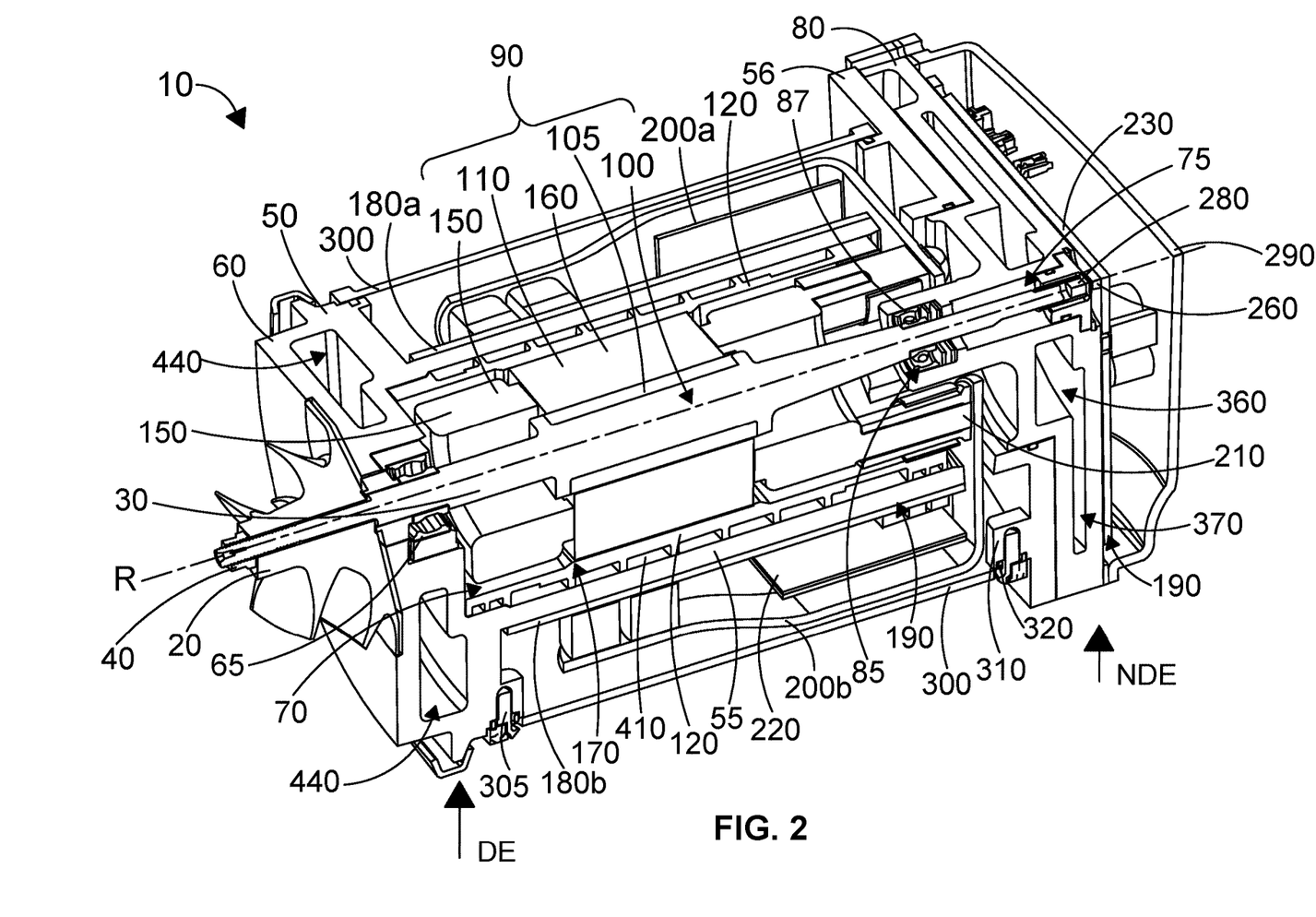
FIG. 2 is a perspective view of a section of the electric compressor of FIG. 1.
Figure 3:
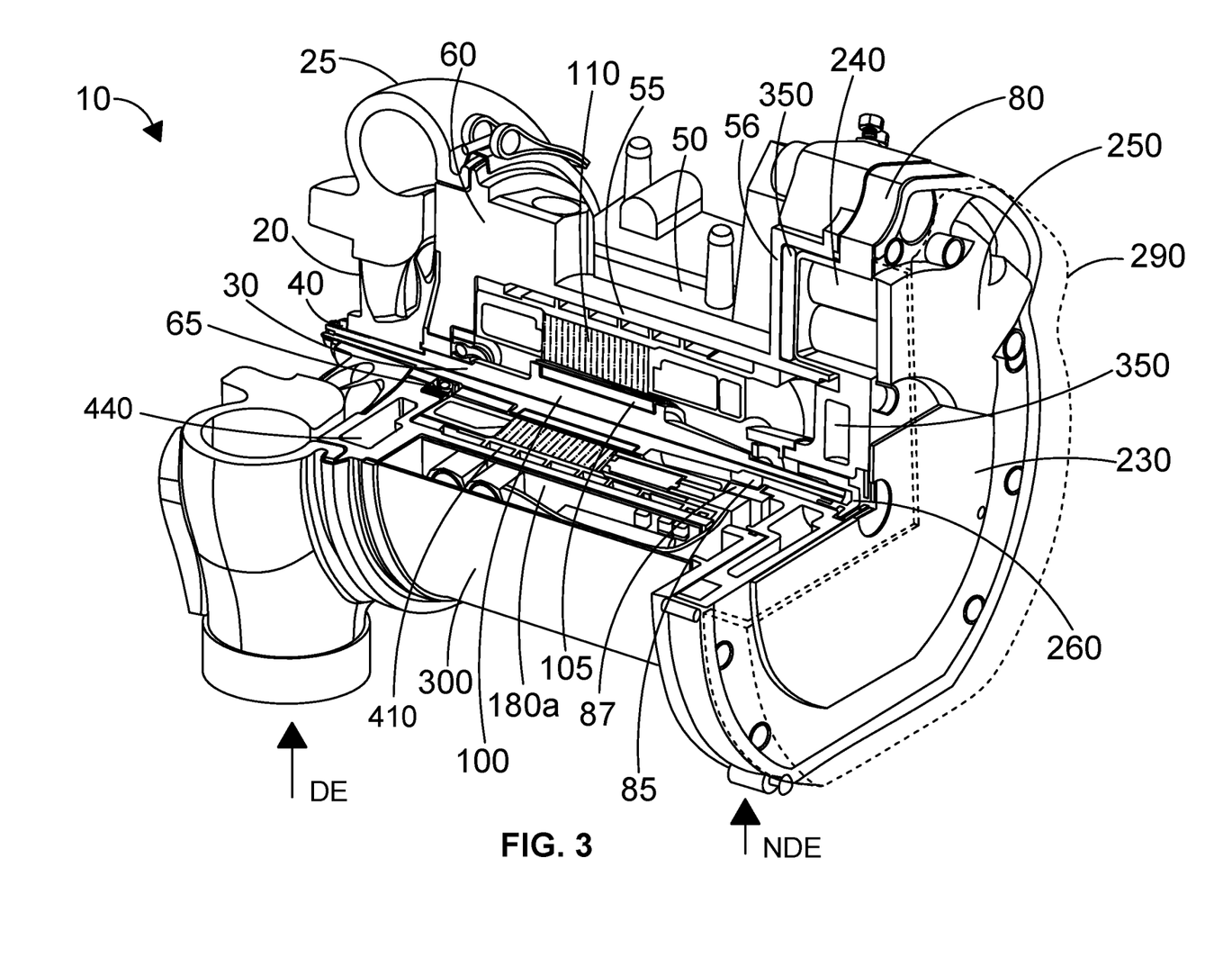
FIG. 3 is a second perspective view of a second section of the electric compressor of FIG. 1, where electric compressor includes the compressor.

Referring to FIGS. 1 to 3 of the drawings, there is depicted a cross-section, a first perspective sectioned view and a second perspective sectioned view of an electric compressor 10, in accordance with the present claimed invention. The electric compressor 10 comprises a compressor 20 situated within a turbo compressor 25. The compressor 20 is connected to a shaft 30 by a threaded fixing 40. The compressor 20, turbo compressor 25 and threaded fixing 40 are known in the state of the art and are not within the scope of the invention.

The shaft 30 protrudes from its fixing with the compressor 20 through the rear-side of the compressor 20 into the housing 50 of the electric compressor 10. The end of the housing 50 adjacent to the compressor 20 is the drive-end (DE) of the housing 50 and electric compressor 10, and the opposing end of the housing 50 and electric compressor 10 removed from the compressor 20 is known as the non-drive-end (NDE).

The wall of the housing at the DE of the housing 50 is known as the drive-end wall 60 and the wall of the housing at the NDE of the housing 50 is known as the non-drive-end wall 80. The NDE wall 80 and DE wall 60 are connected by a side wall 55 of the housing 50 that extends between them.

The shaft 30 extends through the DE wall 60 of the housing 50 through the generally cylindrical central cavity 70 inside the housing 50 towards the NDE wall 80. The DE wall 60 and the NDE wall 80 are separated by the side wall 55 of the housing 50. The interior side of the side wall 55 is generally cylindrical helping to give the central cavity 70 its generally cylindrical shape. The DE wall 60 and the side wall 55 of the housing 50 are integrally formed from a single piece of aluminum. The NDE wall 80 of the housing 50 is a separate piece that is fixed in position onto the housing 50 by fixings between flanges 56 at the end of the side walls 55 and the NDE wall 80. The NDE wall 80 is made aluminum because of its excellent thermal conductance. The NDE wall 80 can be removed from the housing 50 to provide access to the central cavity 70.

The shaft 30 is mounted on two bearings: the DE bearing 65 and the NDE bearing 85. The DE bearing 65 is situated within the DE wall 60 and located between the compressor 20 and the rest of the electric compressor 10 such as the central cavity 70. The NDE bearing 85 is located adjacent to the NDE wall 80 in a bearing housing 87. The bearing housing 87 is attached via an interference fit to the interior side of NDE wall 80. The bearing housing 87 thermally connects the NDE bearing to the NDE wall.

The shaft 30 is arranged to be rotated about rotational axis R by a high-speed electrical machine 90 that is located within the central cavity 70 of the housing 50. The rotational axis R is parallel and coaxial with the longitudinal axis of the shaft 30. The DE wall 60 and the NDE wall 80 are substantially perpendicular to the rotational axis R of the shaft 30, and the side wall 55 is substantially parallel to the rotational axis R of the shaft 30.

The shaft 30 comprises a rotor portion 100 that is the rotor of the electrical machine 90. The rotor portion 100 comprises permanent magnets 105 embedded of the surface of the shaft 30. In alternative embodiments, the permanent magnets 105 are embedded within the interior of the shaft. The rotor portion 100, and shaft 30, extend through the stator 110 of the high-speed electrical machine 90. In this embodiment, the electrical machine 90 is a permanent magnet synchronous motor and the rotor portion 100 and stator 110 are configured in line with the state of the art. The rotor 100 and stator 110 are located approximately centrally along the length of the shaft 30 and approximately centrally between the DE wall 60 and the NDE wall 80 of the housing 50.

Surrounding the electrical machine 90 is a jacket 120. The jacket 120 is generally cylindrical is located around the circumferential walls of the stator 110 such that the jacket 120 is located between the stator 110 and the side wall 55 of the housing 50. In this way, the jacket 120 acts as an EMI shield for the electrical machine 90. The jacket 120 also comprises a plurality of cooling channels 130. The cooling channels 130 are grooves or recesses in the outside surface of the jacket 120. The cooling channels 130 in combination with the inside surface of the side wall 55 define a helical cooling cavity 140 which are arranged for a flow of coolant fluid around the circumference of the jacket 120 and stator 110. In this way, the jacket 120 is arranged to cool the electrical machine 90. The cooling of the electric compressor 10, and electrical machine 90, is discussed in depth later.

The stator 110 comprises windings 150 that extend from either end of the substantially cylindrical stator member 160 into the central cavity 70 of the housing 50. The windings 150 are configured such that the electrical machine 90 is a three-phase motor as is known in the state of the art. Further embodiments are envisaged where the motor is a six-phase or a nine-phase motor for larger electrical machines.

The stator member 160 is held in place inside the central cavity 70, relative to the rotor portion 100, by the jacket 120, where the substantially cylindrical stator member 160 sits within and is fixed in place by a friction fit with a shoulder 170 in the interior surface of the jacket 120.

The NDE end of windings 150 is electrically connected to a power PCB 180a of power electronics assembly 190, or power electronics by an AC busbar 200a and a first electrical connection member 210. In this embodiment, the power PCB is split up into three separate power PCBs 180a, 180b, 180c, where each power PCBs 180a, 180b, 180c is connected by one of the three separate AC busbars 200a, 200b, 200c to the winding 150 of the stator 110. The windings 150 are then connected to one another by a star connection.

Each of power PCBs 180a, 180b, 180c comprises substantially the same circuitry, including transistors 195, such that this circuitry is triplicated within the power electronics assembly 190. Other embodiments are envisaged where the power PCB is not split or alternatively split into a number of boards, e.g. two or six. It is preferred that the PCB is split into the number of phases of the electrical machine 90 or motor.

The electrical connection member 210 extends through the central cavity 70 from the windings 150 towards to NDE wall 80. From the electrical connection member 210, the respective AC busbar 200a, 200b, 200c extends up and through the side wall 55 of the housing 50 in a direction substantially perpendicular to the rotational axis R and is electrical connected to the power PCB 180a. Each of the AC busbars 200a, 200b, 200c electrically connects the windings 150 at a single point to the AC supplied by its respective power PCB 180a, 180b, 180c. The AC busbar 200a, 200b, 200c is of the braided-type such that it can withstand the heating changes and vibrational forces generated during the lifetime of the machine.

Figure 4:
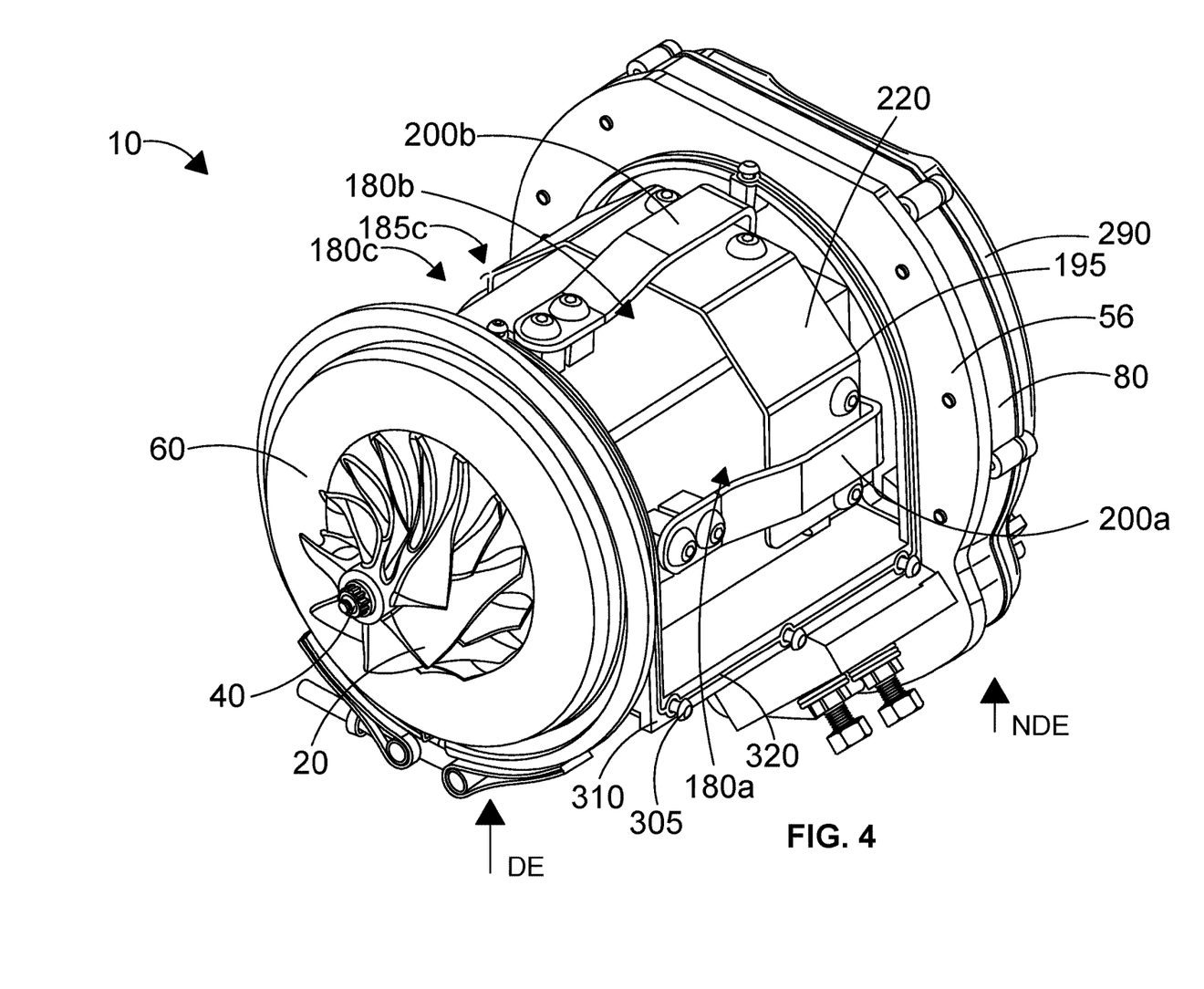
FIG. 4 is a perspective view of the exterior of the electric compressor of FIG. 1, and in particular the power PCBs, where the power cover has been omitted.
Figure 5:
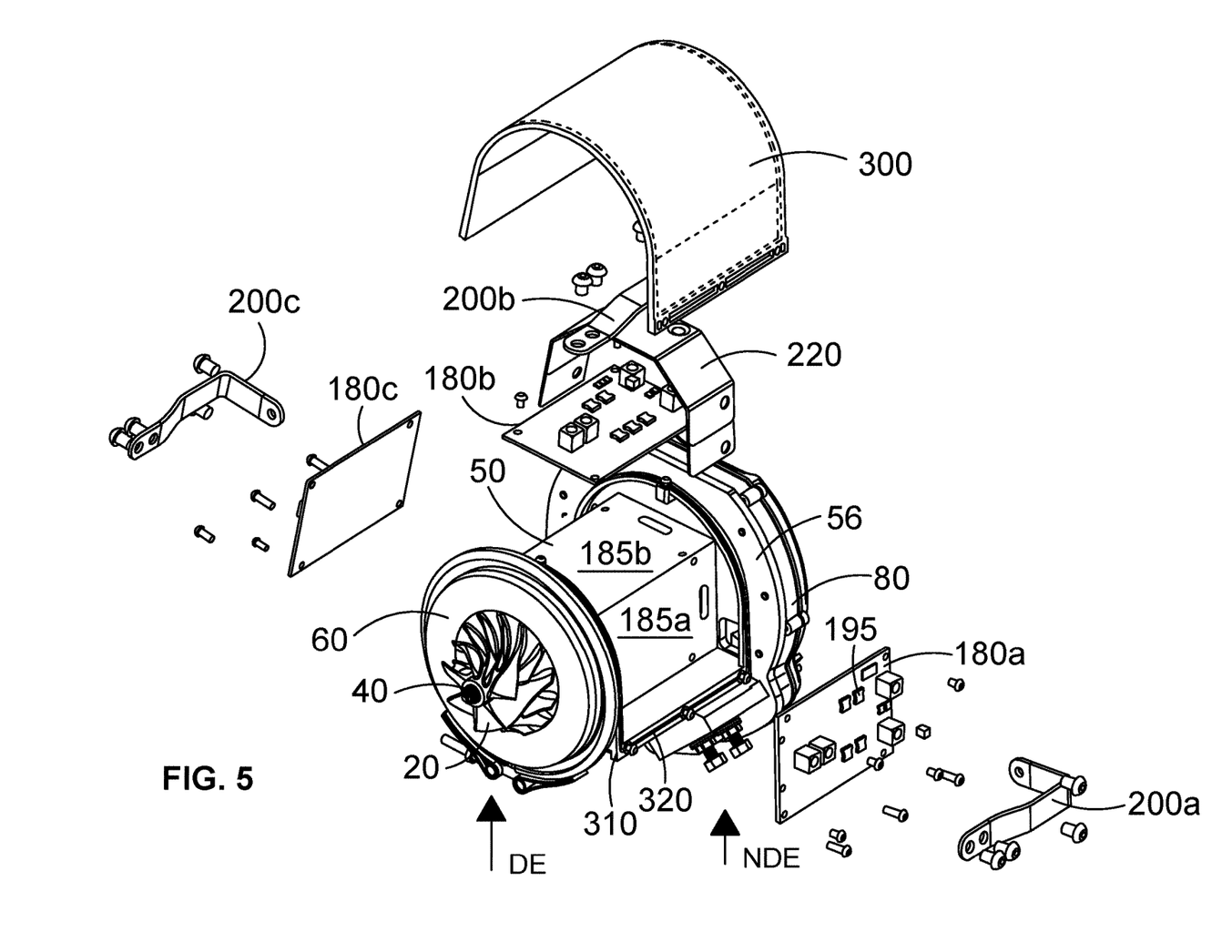
FIG. 5 is an exploded perspective view of the features shown in FIG. 4.

Referring to FIGS. 4 and 5 drawings, the configuration of the three power PCBs 180a, 180b, 180c is depicted in a perspective view and an exploded perspective view. In this embodiment, as is shown in the drawings each of the power PCBs 180a, 180b, 180c is mounted on the side wall 55 of the housing 50, and lies in a plane substantially perpendicular with the rotational axis R. That is, the three power PCBs the 180a, 180b, 180c are mounted on three separate flat surfaces 185a, 185b, 185c on the exterior of the side wall 55 of the housing 50. Each of the three flat surfaces 185a, 185b, 185c lies in a plane substantially parallel with the rotational axis R of the shaft and is substantially planar and rectangular.

The three flat surfaces 185a, 185b, 185c are configured in a generally square-bottomed U-shape relative to one another, such that one flat surface 185b is substantially perpendicular to the other two substantially parallel flat surfaces 185a, 185c. Or, in other words, the three flat surfaces 185a, 185b, 185c occupy three sides of a square. The three power PCBs 180a, 180b, 180c are each mounted onto one of the flat surfaces 185a, 185b, 185c, such that they are also configured in a generally square-bottomed U-shape relative to each other. Other arrangements of the three flats surface 185a, 185b, 185c and the power PCBs 180a, 180b, 180c, mounted thereon are envisaged, such as a generally triangular arrangement, a pentagonal arrangement or a hexagonal arrangement etc., where the power PCBs are mounted on some or all of the arrangements surfaces.

All three of the power PCBs 180a, 180b, 180c are supplied with DC power by a DC link busbar 220. The DC link busbar 220 is connected by two electrical connections 235 to the power PCBs 180a, 180b, 180c. Each of the power PCBs 180a, 180b, 180c acts as an inverter using power electronics as is known in the state of the art. The DC link busbar 220 is generally U-shaped such that it can connect with each of the three power PCBs 180a, 180b, 180c simultaneously.

Splitting the power PCB into three separate power PCBS 180a, 180b, 180c enables the power PCB to be mounted on the side wall 55 of the housing 50 without extending beyond the circumferential footprint of the DE wall 60 or circumferential footprint of the turbo compressor 25. Or, in other words, the power PCB 180a, 180b, 180c does not increase the maximum diameter, or distance from the rotational axis R, of the electric compressor 10. Instead, this maximum diameter or distance from the rotational axis R is defined by the compressor 25 of the art. In this way, splitting the power PCB 180*a* and incorporating it onto the side of the housing 50 of the electric compressor 10 compacts it. That is, splitting the power PCBs 180*a*, 180*b*, 180*c* substantially reduces the size of the electric compressor 10 as the power PCB 180*a*, 180*b*, 180*c* is not a monolithic PCB and can fit closely and around the components of the electric compressor 10 that are harder to reduce in size. Compacting the electric compressor 10 is on particular importance in vehicle applications due to the limited size in an engine bay of a vehicle. Splitting the power electronics assembly 190 further can help reduce the mass of the electric compressor 10 that is also beneficial in vehicles.

Referring back to FIGS. 1 to 3, the DC power supplied to the DC link busbar 220 is supplied by the input busbar 250. The input busbar 250 is mounted on the exterior side of the NDE wall 80. The input busbar 250 receives DC electric from a DC source such as a battery in a vehicle. In this embodiment, the electric compressor 10 and its components are configured to work with a 48 V DC supply that is used to power a modern hybrid power train in a vehicle. Other embodiments are envisaged using a DC power supply in the range of 12 to 800+ V.

Further, the input busbar 250 comprises capacitors 240 that are located on the input busbar 250 and receive power from the DC power supply. The capacitors 240 are located within the NDE wall 80 of the electric compressor 10. The input busbar 250 and the capacitors 240 are mounted on the NDE wall 80 thus limiting their footprint.

The control PCB 230 comprises a sensor 260 for detecting of the speed rotation of the shaft 30, i.e. speed of the electrical machine 90. The sensor 260 is mounted directly on the control PCB 230 and is located on the rotational axis R of the shaft 30. The shaft 30 itself extends into a sensor portion 75 of the central cavity 70, where the sensor portion 75 is substantially cylindrical and extends from the end of the windings 150 towards the NDE wall 80. The sheath 270 holds the permanent magnet 280 in a position within a sensor portion 75 of the central cavity 70 adjacent to, but not engaging, the rear side of the NDE wall 80. As such, the permanent magnet 280 mounted onto the shaft 30 proximate to the rear side of the control PCB 230, and more specifically, the sensor 260. The speed of the electrical machine 90 is sensed directly by the control PCB 230 by the sensor 260 sensing the rotation of the magnetic fields of the magnet 280. The sensor 260 and permanent magnet provides an acceleration advantage for the high-speed electrical machine. Embodiments of the electrical compressor 10 that do not comprise the sensor 260 and permanent magnet 280 are envisaged. The control PCB 230 is protected by a control cover 290 that completely encapsulates the control PCB 230 in a watertight and airtight manner.

The control PCB 230 comprises a sensor 260 for detecting of the speed rotation of the shaft 30, i.e. speed of the electrical machine 90. The sensor 260 is mounted directly on the control PCB 230 and is located on the rotational axis R of the shaft 30. The shaft 30 itself extends into a sensor portion 75 of the central cavity 70, where the sensor portion 75 is substantially cylindrical and extends from the end of the windings 150 towards the NDE wall 80. The sheath 270 holds the permanent magnet 280 in a position within a sensor portion 75 of the central cavity 70 adjacent to, but not engaging, the rear side of the NDE wall 80. As such, the permanent magnet 280 mounted onto the shaft 30 proximate to the rear side of the control PCB 230, and more specifically, the sensor 260. The speed of the electrical machine 90 is sensed directly by the control PCB 230 by the sensor 260 sensing the rotation of the magnetic fields of the magnet 280.

The sensor 260 and permanent magnet provides an acceleration advantage for the high-speed electrical machine. Embodiments of the electrical turbomachine 10 that do not comprise the sensor 260 and permanent magnet 280 are envisaged. The control PCB 230 is protected by a control cover 290 that completely encapsulates the control PCB 230 in a watertight and airtight manner.

Figure 6:
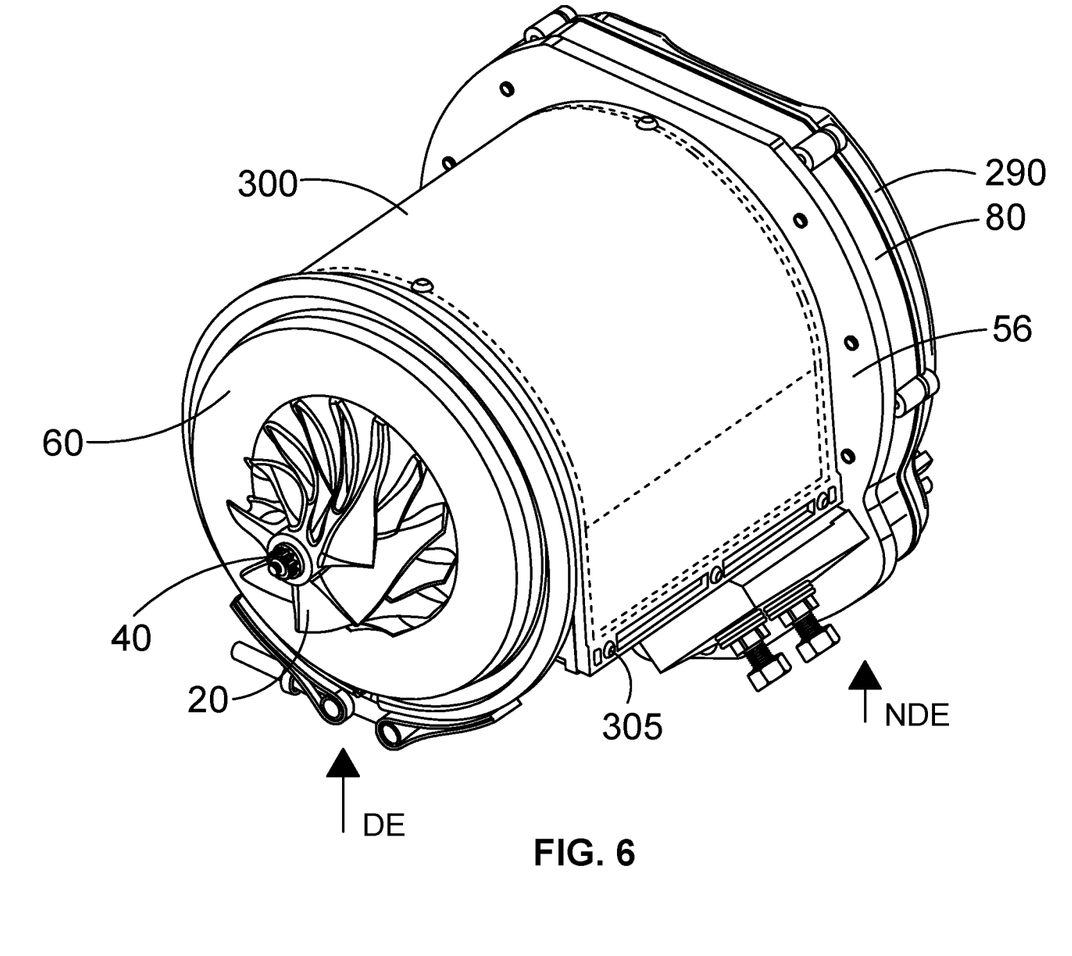
FIG. 6 is the perspective view of the electric compressor of FIG. 4, where the power cover is included.

Referring to FIGS. 5 and 6 of the drawings, there is depicted a power cover 300 for covering and protecting the power PCBs 180*a*, 180*b*, 180*c*. The cover 300 is arranged to be fixed by screws 305 onto a rim 310 of the housing 50. The cover 300 is generally U-shaped and is integrally formed from a single piece. When the cover 300 is attached to the rim 310 of the housing 50, a rubber seal 320 is sandwiched between the cover 300 and the rim 310. The rubber seal 320 is compressed between the cover and the rim 310 to give a watertight seal. Using a single cover, the power cover 300, reduces the number of egress points and point points of failure of fluids.

Accordingly, due to the control cover 290 and power cover 300, the electric compressor 10 can be used in vehicles as the power electronics assembly 190 is sufficiently protected from water and cleaning products used to clean the engine bay of a vehicle.

The implementation as described of the power electronics assembly 190 as described above produces a design implementation that does not need a separate installation location, separate connections and sealing requirements and thereby avoids increasing in the number of failure modes. Further, the implementation of the power electronics assembly 190 distributes the power electronics assemblies around the machine enables the power electronics assembly 190 to stay closer to the outline of the machine and, essentially, reducing its size such that it is kept within the overall confines of circumferential footprint and space allocation of the electrical turbomachine.

Figure 7:
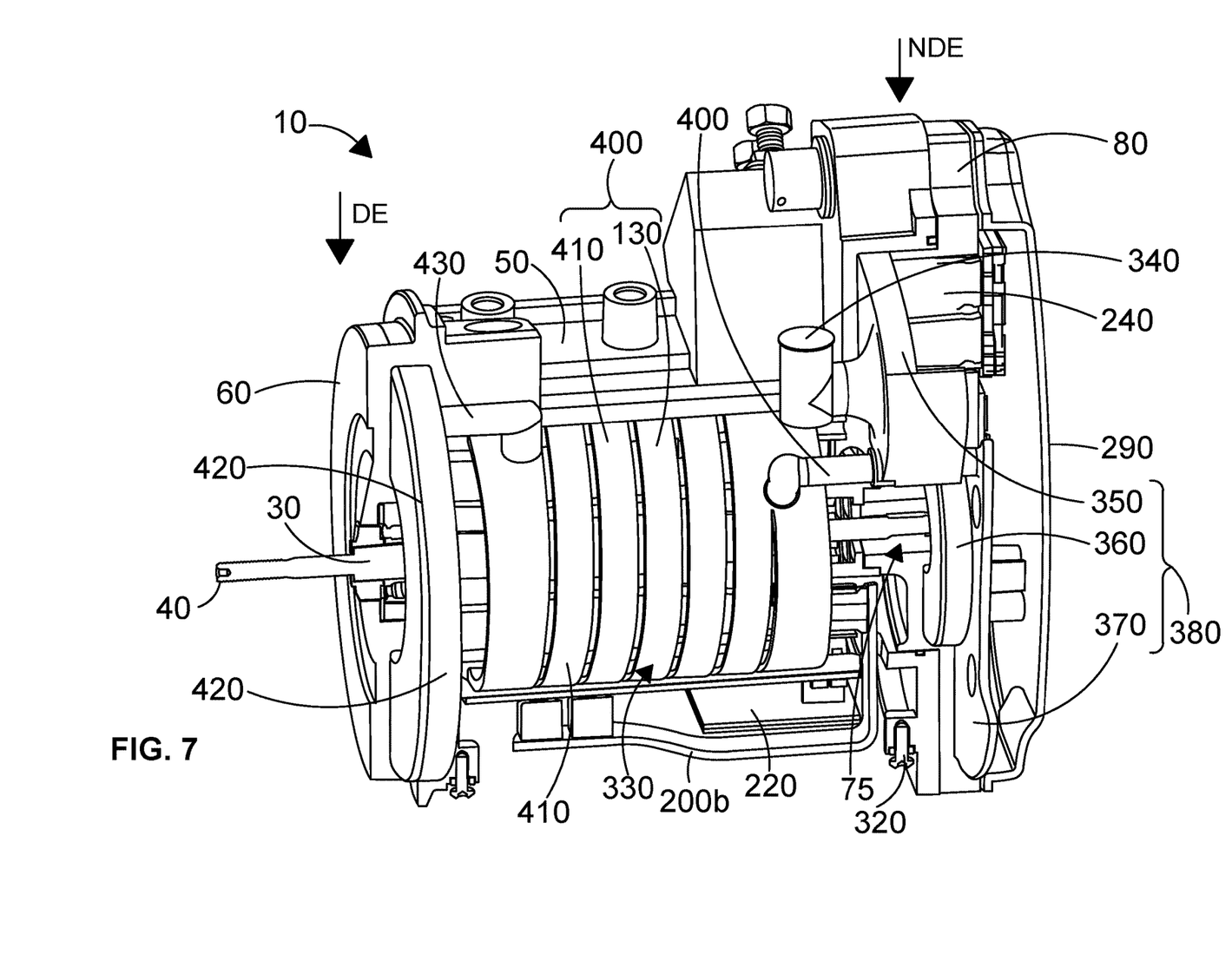
FIG. 7 is a cross-section of the electric compressor of FIG. 1, where the pathway of the cooling system remains in the half of the machine removed in the cross-section.

Referring to FIG. 7, the cooling system 330 of the electric compressor 10 in accordance with the present invention is depicted. FIG. 7 depicts a cross-section where half of the electric compressor 10 has been removed. In the half that has been "cut-away" in FIG. 7, the cooling system 330 has been left to illustrate cooling system 330.

A single cooling system 330 is used to cool all of the components of the electric compressor 10. The cooling system 330 comprises a continuous cooling circuit around the interior of housing 50 of the electric compressor 10. The cooling system 330 is design for a coolant fluid, such as water, glycol or another suitable coolant, to be pumped, by a pump (not shown), around the interior of the electric compressor 10. The cooling system 330 comprises a plurality of individual cooling cavities, as described herein, connected directly or by a number of cooling conduits to form a complete cooling system 330 for the entire electric compressor 10. Each of the cooling cavities is surrounded by a thermally conductive material to assist in the transfer of heat form the electric compressor 10 to the coolant fluid.

In this embodiment, aluminum is preferred due to its excellent the thermally conductivity, immunity to rust, resistance to corrosion and strong mechanical properties.

The coolant fluid enters the cooling system 330 at the coolant inlet 340 which is located on the side wall 55 of the housing 50 and proximate the NDE wall 80 and NDE of the electric compressor 10. The positioning of the coolant inlet 340 is flexible but it is preferred from it to be closer to the NDE of the electric compressor.

From the coolant inlet 340, the coolant fluid can flow through to a capacitor coolant cavity 350. The capacitor coolant cavity 350 is formed between the flanges 56 of the housing 50 and the NDE wall 80, and extends substantially along the end of the capacitors 240 removed from the control PCB 230.

From the capacitor coolant cavity 350, the coolant can flow into the NDE coolant cavity 360. The NDE coolant cavity 360 is a torus-shaped, or toroid-shaped, cavity in the NDE wall 80 that encircles the sensor portion 75 of the central cavity 70. It is important to keep the permanent magnet 280 for the sensor 260 cool, such that the magnetism of the permanent magnet 280 is not degaussed. The NDE coolant cavity 360 not only cools the sensor cavity 75 but also cools the interior and exterior sides of the NDE wall 80. The NDE coolant cavity 360 aids in cooling both the central cavity 70 and the components housed therein, including the sensor portion 75 of the cavity, but also the control board 230 mounted on the exterior surface of the NDE wall 80. The NDE coolant cavity 360 therefore performs triple-sided cooling.

Furthermore, the NDE coolant cavity 360 is thermally linked with the bearing housing 87 such that it can removed heat conducted along the shaft which heats the NDE bearing 85 and self-heating of the NDE bearing 85. These heat flows act to increase the operating temperature of this bearing 85, which would lead to a markedly reduced life if it were not cooled by the NDE coolant cavity 360.

The NDE coolant cavity 360 does not extend the full height or width of the NDE wall 80 or control board 230. A control PCB coolant cavity 370 is provided to cool the part of the control PCB 230 not sufficiently cooled by the capacitor coolant cavity 350 or the NDE coolant cavity 360. The control PCB coolant cavity 370 is substantially plate-like and is a cavity within the NDE wall 80 and is supplied with coolant fluid from the NDE coolant cavity 360.

The capacitor coolant cavity 350, the NDE coolant cavity 360 and the control PCB cooling cavity 370 are the NDE wall coolant portion 380 of the cooling system 330 and each of the cavities is fluidly connected to allow coolant fluid to circulate throughout them via a continuous pathway or circuit.

The NDE wall coolant portion 380 is fluidly connected to the central coolant portion 390 by a first cooling conduit 400. The first cooling conduit 400 supplies coolant fluid to the central coolant portion 390 and a helix coolant cavity 410. The helix coolant cavity 410 is a continuous helix that wraps around the electrical machine 90 from the NDE wall 80 towards the DE wall 60. The helix coolant cavity 410 is formed from the coolant channels 130 in the jacket 120 engaging with the side wall 55 of the housing 50. That is, the jacket 120 comprises a helical coolant channel 130 in its exterior surface that is sealed by engaging the side wall 55. The majority of the exterior surface of the jacket 120 is the coolant channel 130. The cross-section of a portion of the helix coolant cavity 410 is generally rectangular. The longer edges of the rectangular cross-section are parallel to the rotational axis R. In this embodiment, the helix of the coolant channel 130, and the helix coolant cavity 410, has seven turns. The number of turns and the helical geometry of the helix coolant cavity 410 can be modified according to the requirements of the cooling system 330. For example, the number of turns could be increased to increase heat transfer to the coolant with the drawback of the higher inlet pressure due to increased pressure drop across the fluid. In this embodiment, seven turns was found by the applicant to be a comprise which provided adequate cooling while simultaneously not increasing the pressure beyond that of the rating of the pump typically used in the desired application. This is because the coolant fluid in this embodiment will be provided by the pump of the internal combustion engine's coolant system. Other embodiments are envisaged in that the coolant cavity 410 is not a helix but rather interconnected parallel channels.

Coolant fluid entering the helix coolant cavity 410 will circle the electrical machine 90 seven times before exiting the helix coolant cavity 410 and entering the DE cooling portion 420 by a second conduit 430. The helix coolant cavity 410 has a double-sided cooling activity as it cools both the electrical machine 90 (i.e. central cavity 70, rotor 90, stator 110 and windings 150) and the power PCBs 180a, 180b, 180c via cooling the jacket 120 and side wall 55, respectively.

The turn of the helix coolant cavity 410 proximate the DE wall 60 is fluidly connected by a second cooling conduit 430 to the DE coolant cavity 440. The DE coolant cavity 430 is a torus-shaped, or toroid-shaped, cavity within the DE wall 60 that encircles the DE bearing 65 and the location on the DE wall 60 which the shaft 30 protrudes through the DE wall 60 to connect to the compressor 20. The DE coolant cavity 430 is substantially larger in volume than the similarly shaped NDE coolant cavity 360, reflecting the fact that, in use, the DE of the electric compressor 10 will be substantially hotter than the NDE of the electric compressor 10 in use. This is because of the DE proximity to the hot fluids (e.g. compressed engine intake air) onto which the turbo compressor 25 and compressor 20 have performed work. The DE coolant cavity 440 performs triple sided cooling of the central cavity 70 and DE bearing 65. Integrating the DE bearing 65 within the DE wall 60 enables the DE bearing 65 to be cooled by the DE coolant cavity 440. Heat from the compressor 25 is conducted into the electric compressor 10 through the housing 55 and heats the DE bearing 65 and the DE bearing 65 self-generates heat internally. These heat flows act to increase the operating temperature of the DE bearing 65, which would lead to a markedly reduced lifespan if not cooled. This problem is addressed by the DE coolant cavity 430 that not only cools heat from the compressor 20 but also the self-generated heat from the DE bearing 65.

The coolant fluid leaves the DE coolant cavity 440 via an outlet 450. In use, the outlet 450 is connected by piping to a radiator such that the coolant fluid can be cooled before circulating back into the cooling system 330 via the inlet 340. The cooling system 330 flows from the NDE cooling portion 380 to helix coolant cavity 410 to DE coolant cavity 440 the DE end of the electric compressor 10 is hotter than the NDE. By pumping the coolant fluid in this direction, i.e. along increasing temperature gradient, the cooling system 330 ensures that each part of the electric compressor 10 is sufficiently cooled.

In the prior art, the control PCB 230 and the power PCBs 180a, 180b, 180c are typically cooled by one or more cooling systems and the electrical machine 90 by another cooling system. This significantly increases the size of the electric compressor 10. The electric compressor 10 and cooling system 330 of the present invention has the advantage of being more compact and have less components as a single cooling system 330 or cooling circuit can cool every part of the electric compressor 10. This is particularly advantageous in vehicle applications as it reduces the size of the electric compressor 10 such that is occupies less space in the engine bay while also reducing the mass of the overall system.

Figure 8:
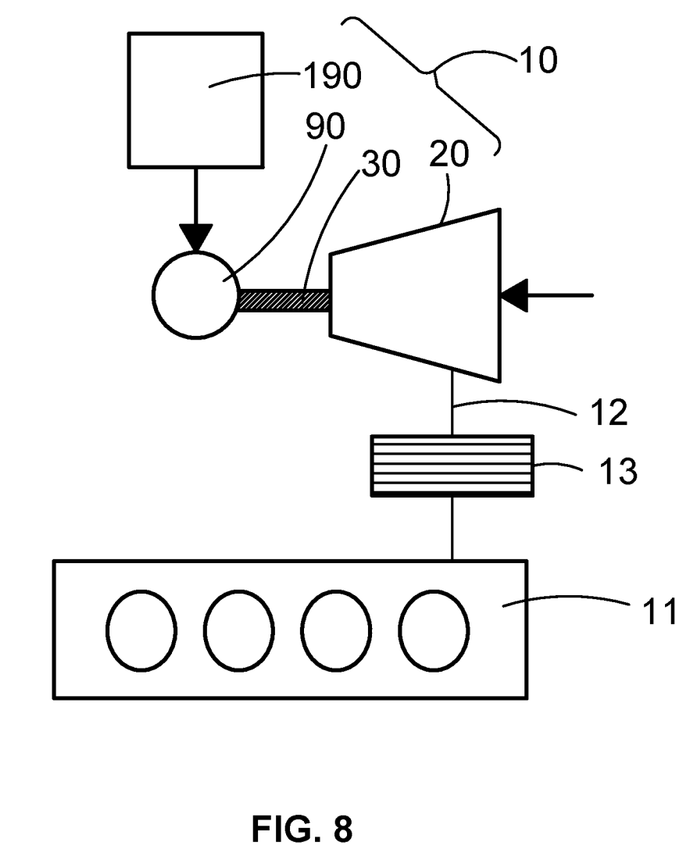
FIG. 8 is a schematic layout of an electric compressor connected to an internal combustion engine in accordance with the present claimed invention.

Referring to FIG. 8 of the drawings, there is shown a schematic diagram showing how an electric compressor 10 could be connected in relation to an internal combustion engine 11. The electric compressor 10 is in accordance with the present invention and comprises power electronics 190 that supplies a current to a high-speed electrical machine 90. The high-speed electrical machine 90 is arranged convert the electric current suppled to it by the power electronics 190 to rotation of the shaft 30 and the compressor 20 connected by the end of the shaft 30. Rotation of the compressor 20 by the high-speed electrical machine 90 draws in a fluid. In this example embodiment, rotation of the compressor 20 draws in air from the environment into the compresses the air, boosting the pressure of the air. The pressure-boosted air leaves the compressor 20 by the inlet conduit 12 and travels towards the internal combustion engine 11. Along the pathway of the inlet conduit 12 is located a radiator 13 which is arranged to cool the pressure-boosted air in the inlet conduit 12, prior to the pressure-boosted air entering the internal combustion engine 11. The amount of boost pressure generated by the electric compressor 10 in the pressure-boosted air is controlled by the speed of rotation of the high-speed electrical machine 90, whereby the rotational speed of the high-speed electrical machine 90 is controlled from inputs from the power electronics 190. The power electronics 190 can control the boost pressure in response to a number of sensors or readings, for example, this will typically be a request from the engine control unit that will request a set speed. However, other parameters could be measured such as the power, emissions or efficiency of the internal combustion engine 11 and the power electronics assembly 190 could respond accordingly.

The above description refers exclusively to an electric compressor 10. Other embodiments, including other electric turbomachines are envisaged. For example, a turbocharger or turbogenerator where the power electronics are similarly mounted directly onto the housing of the turbocharger or turbogenerator to reduce the footprint and packaging size. Additionally, an electric turbomachine comprising a single cooling system integrated into the housing of the turbocharger or turbogenerator to provide cooling for its electrical machine and its power electronics assembly is within the scope of the present invention.

The invention claimed is:

1. An electric turbomachine for use with an internal combustion engine, a turbocharger or a fuel cell e-compressor, said electric turbomachine comprising:
    a high-speed electrical machine located internally within a housing that is arranged to be rotationally driven by a shaft about a rotational axis (R);
    a compressor that is arranged to compress fluid within a turbo compressor when it is rotationally driven about the rotational axis (R) by the shaft; and
    a power electronics assembly that is arranged to supply power to the electrical machine;
    a control assembly that is arranged to control the power supplied by the power electronics assembly to the electrical machine,
    wherein at least a portion of the power electronics assembly is mounted externally on the housing on a first surface of the housing and the control assembly is mounted externally on the housing on a second surface of the housing;
    wherein the first surface and the second surface are substantially orthogonal with respect to one another; and
    wherein the first surface lies in a plane which is substantially parallel with the rotational axis (R) and the second surface lies in a plane which is substantially orthogonal to the rotational axis (R).

2. The electric turbomachine of claim 1, wherein the first surface and the second surface are separated by a protrusion or protuberance from the housing.

3. The electric turbomachine of claim 1, wherein the power electronics assembly is mounted externally on the housing such that A circumferential footprint of the power electronics assembly is smaller than a circumferential footprint of the turbo compressor.

4. The electric turbomachine of claim 1, wherein the power electronics assembly is mounted externally on the housing such that A circumferential footprint of the power electronics assembly is smaller than a circumferential footprint of the housing.

5. The electric turbomachine of claim 1, wherein the power electronics assembly comprises a plurality of power PCBs, or power printed circuit boards, that are each externally mounted on the housing on a different surface to the second surface upon which the control assembly is mounted.

6. The electric turbomachine of claim 5, wherein each of the power PCBs in the power electronics assembly is mounted on the first surface.

7. The electric turbomachine of claim 5, wherein at least one of the power PCBs in the plurality of power PCBs is mounted on the first surface and at least one of the power PCBs in the plurality of power PCBs is mounted externally on a third surface of the housing.

8. The electric turbomachine of claim 7, wherein adjacent power PCBs in the plurality of power PCBs are mounted at an angle to one another.

9. The electric turbomachine of claim 8, wherein the adjacent power PCBs in the plurality of power PCBs are mounted orthogonally to one another.

10. The electric turbomachine of claim 8, the plurality of the power PCBs surround over 50% of a circumference of the housing at a mid-point of the housing in a direction parallel with the rotational axis.

11. The electric turbomachine of claim 5, wherein each of the power PCBs in the plurality of power PCBs comprises substantially identical circuitry as the other power PCBs in the plurality of power PCBs.

12. The electric turbomachine of claim 5, wherein the plurality of power PCBs are electrically connected by a busbar comprising two or one angled portions.

13. The electric turbomachine of claim 5, wherein each power PCB in the plurality of power PCBs is mounted onto the housing in a direction substantially parallel with the rotational axis of the electric turbomachine.

14. The electric turbomachine of claim 1, wherein the power electronics assembly is protected from an external environment by an airtight and watertight cover that is also mounted onto the housing.

15. The electric turbomachine of claim 14, wherein the airtight and watertight cover is formed from a single-piece and is substantially U-shaped.

16. The electric turbomachine of claim 1, wherein the control assembly is mounted externally on the housing such that a, circumferential footprint of the control assembly is less than a circumferential footprint of the turbo compressor.

17. The electric turbomachine of claim 1, wherein the control assembly is mounted externally on the housing such that a circumferential footprint of the control assembly is less than a circumferential footprint of the housing.

18. The electric turbomachine of claim 1, wherein the control assembly is mounted on an end of the housing opposing the turbo compressor.

19. The electric turbomachine of claim 1, wherein the control assembly comprises a sensor for directly detecting the rotational speed of the high-speed electrical machine.

20. The electric turbomachine of claim 1, wherein the control assembly is protected from an external environment by a single-piece airtight and watertight control cover.

21. The electric turbomachine of claim 1, wherein the electric turbomachine comprises a cooling system that is integrated within the housing of the electric turbomachine for cooling the electric turbomachine and the power electronics assembly simultaneously.

22. The electric turbomachine of claim 21, wherein the cooling system that is integrated within the housing of the electric turbomachine is also arranged to cool the control assembly.

* * * * *